(No Model.) 2 Sheets—Sheet 1.

D. A. WILLBANKS.
TIRE SHRINKING MACHINE.

No. 316,511. Patented Apr. 28, 1885.

Witnesses.
N. A. Clark.
W. D. McKenna

Inventor
David A. Willbanks
Howard A. Snow.
Att'y

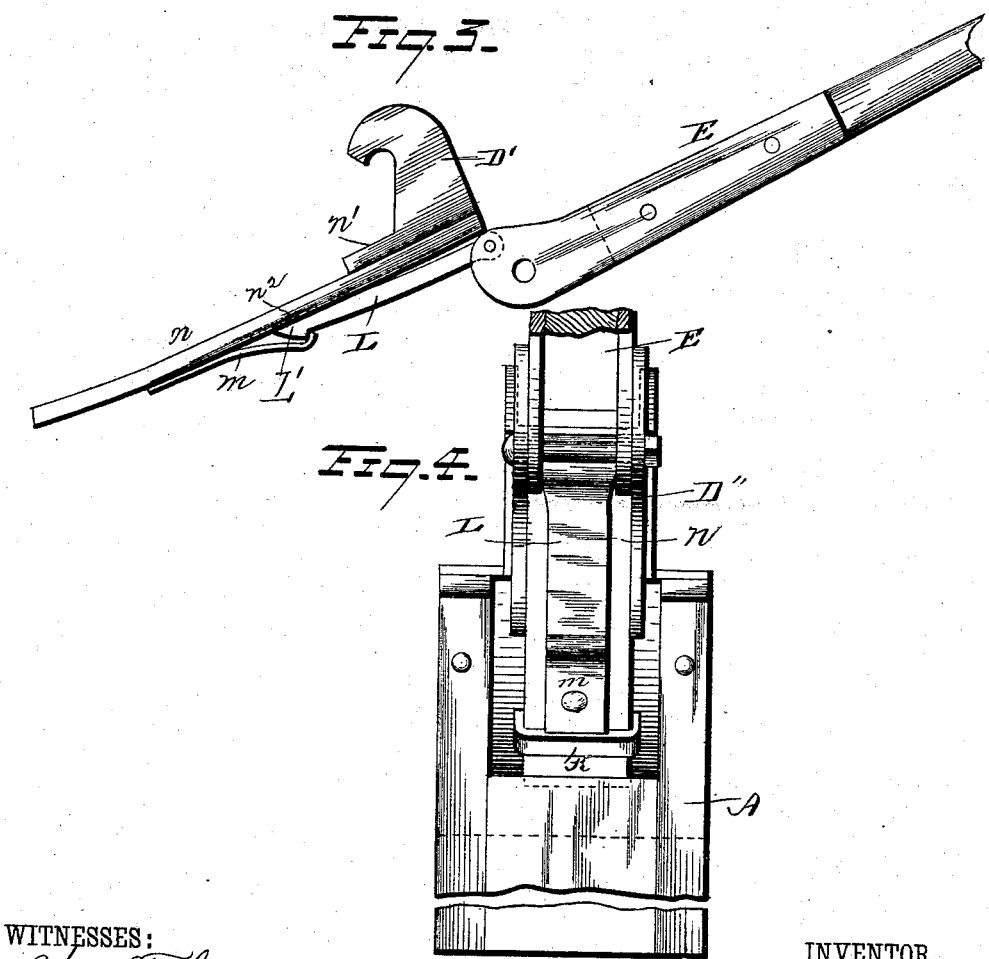

UNITED STATES PATENT OFFICE.

DAVID A. WILLBANKS, OF HIGH SHOALS, GEORGIA, ASSIGNOR OF ONE-HALF TO THOMAS C. LAUNIUS, OF SAME PLACE.

TIRE-SHRINKING MACHINE.

SPECIFICATION forming part of Letters Patent No. 316,511, dated April 28, 1885.

Application filed March 28, 1884. (No model.)

*To all whom it may concern:*

Be it known that I, DAVID A. WILLBANKS, of High Shoals, county of Walton, and State of Georgia, have invented a new and useful Improvement in Tire-Shrinkers; and I do hereby declare that the following is a full, clear, and exact description of the invention, which will enable others skilled in the art to which it appertains to make and use it, reference being had to the accompanying drawings, forming a part thereof.

My invention relates to improvements in tire-shrinkers; and the object of this invention is to provide a tire-shrinker that will work effectually, and by which the requisite power may be afforded and applied without distorting or breaking the machine.

My invention consists in the novel construction, combination, and arrangement of its several parts, as will be hereinafter more fully described, and pointed out in the claims. I attain this object by the mechanism illustrated in the accompanying drawings, in which—

Figure 1:
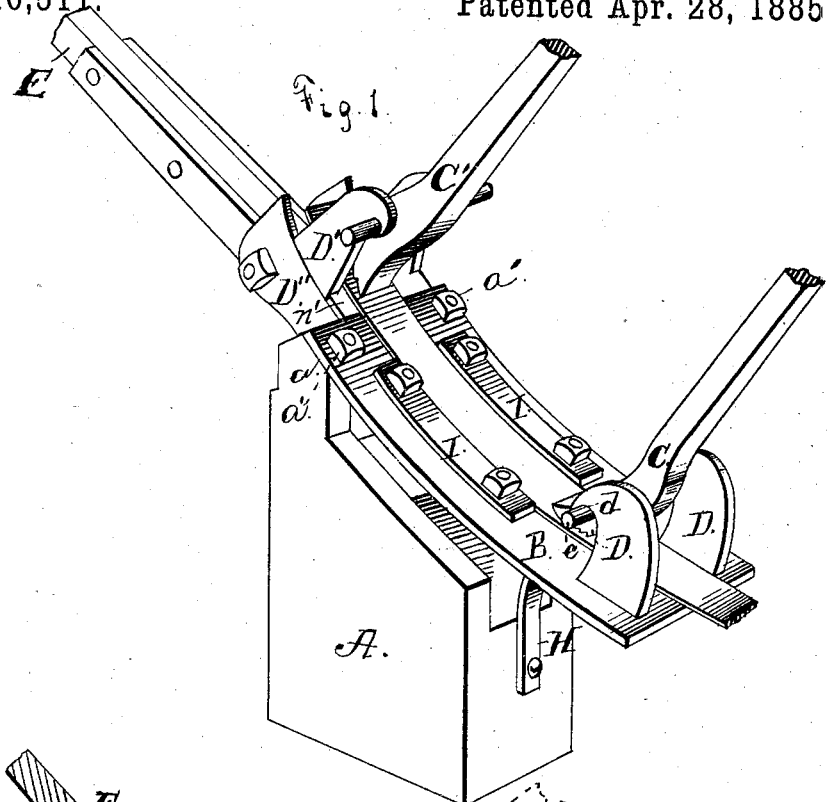
Figure 2:
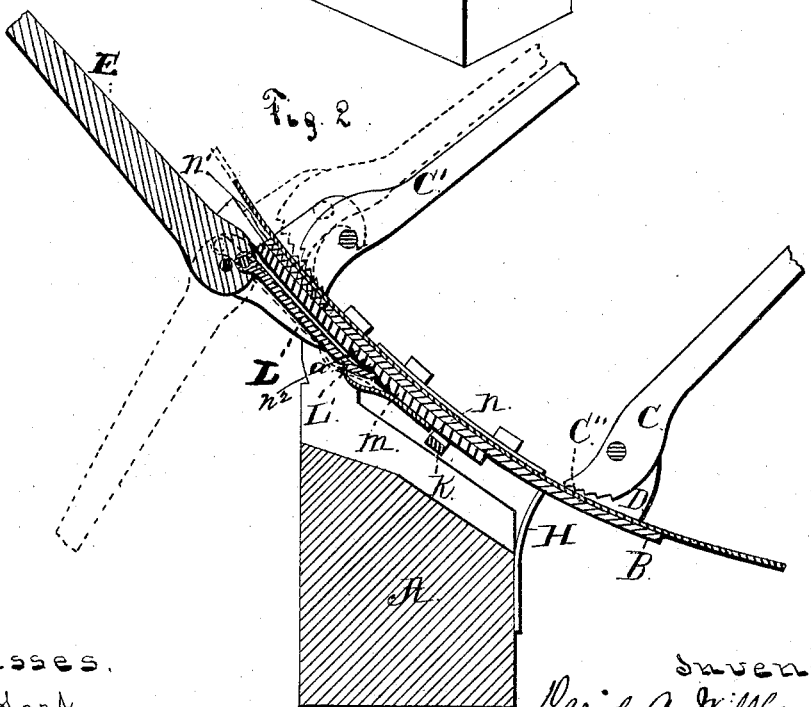

Figure 1 is a perspective view of my invention, and Fig. 2 is a vertical cross-section of the same; Fig. 3, a detail view of lever E and the connected parts which it moves. Fig. 4 is a rear elevation of the device, taken from the left hand of Figs. 1 and 2.

Similar letters of reference refer to similar parts throughout the several views.

A is a block or foundation, formed as shown, upon which my device rests, and which has the extending projections $a\ a$ on each side of the block at its highest point.

To the lower side of the block A is secured a rod, H, which projects upward and outward, as shown, and upon which rests a curved plate, B, which extends to and rests upon the projections $a\ a$, to which it is suitably secured. Two arms, D'', are formed with or secured to the plate B, and to the under side of said plate is secured a staple, K, the object of which will be further fully described.

Two strips of metal, I I, are placed upon the upper surface of the plate B, with a space between them of any desired width to receive the tire to be shrunk.

Two curved uprights, D D, are cut under at the top to form seats $d$ for the reception of the axle $e$ of a lever, C, which latter is provided with ratchet-teeth on its underside, which are intended to rest upon and hold the tire, as shown in Figs. 1 and 2.

A slide, $n$, works under the plate B, sustained at the lower end by the staple K, and at the upper by a widened and raised portion, $n'$, which rides upon the jaws D'' D'', fixed upon the plate B or some other fixed portion of the device. The upper surface of the raised portion or shoulder $n'$ is on a level with the upper surface of plate B, and is intended to receive the tire just as the plate B does, as shown in Figs. 1 and 2.

Uprights D' D', secured to part $n'$, and corresponding in form and function to uprights D, receive the axle of a second ratchet-ended lever, C', which bears upon the tire, as shown.

Now, when the tire is put in place and the levers C C' brought to bear upon it, it is shrunken by having the levers C C' forced together. This is accomplished by having the slide $n$ moved in the proper direction, and a connecting-piece, L L', is for this purpose secured upon the slide $n$, in the manner hereinafter described, at one end, and pivoted to a lever, E, at the other. This lever E is also pivoted to the jaws D'' eccentrically to the pivot which connects it with connecting-piece L, as shown in Fig. 2. By depressing the lever E, as shown by dotted lines in Fig. 2, the part $n'$ will be drawn upward away from plate B, and if while in this position the levers C C' be made to impinge upon the tire, the tire will be shrunk or swaged together longitudinally by the elevation of the lever E, as shown in full lines, Fig. 2, which, as shown, will force the part $n'$ down toward the plate B.

In order to vary the position of the part $n'$ upon the jaws D'', the slide $n$ is provided with several notches or ratchets, $n^2$, into any one of which the point L' of the connecting-piece L may be set and held by the confining-spring $m$.

Having thus described my invention, what I claim as my invention, and desire to secure by Letters Patent, is—

1. The combination, with the curved plate B, having the uprights D and lever C, and provided at the upper end with the jaws D'', of the plate $n$, having the shoulder $n'$, uprights D', and lever C', and the lever E, connected with the plates B and $n$ to move said plate $n$, as set forth.

2. The plate B, having the guide-strips I I, and provided with the uprights D and lever C at the lower end, and the jaws D″ at the upper end, in combination with the plate n, having the notches $n^2$ on its under side, the connection L, having the bent point L′, and the confining-spring m, shoulder n′ on plate n on a level with the plate B, and adapted to slide up jaws D″, uprights D′ on shoulder n′, and lever C′, working in uprights D′, and lever E, pivoted to to connection L and to jaws D″, substantially as and for the purpose set forth.

In testimony that I claim the foregoing I append my signature.

DAVID A. WILLBANKS.

Witnesses:
JAMES FRAZER,
W. G. LOWRY.